Aug. 6, 1929.  R. ECKSTEIN  1,723,727
ELECTRIC BATTERY AND METHOD FOR MAKING SAME
Filed March 17, 1927
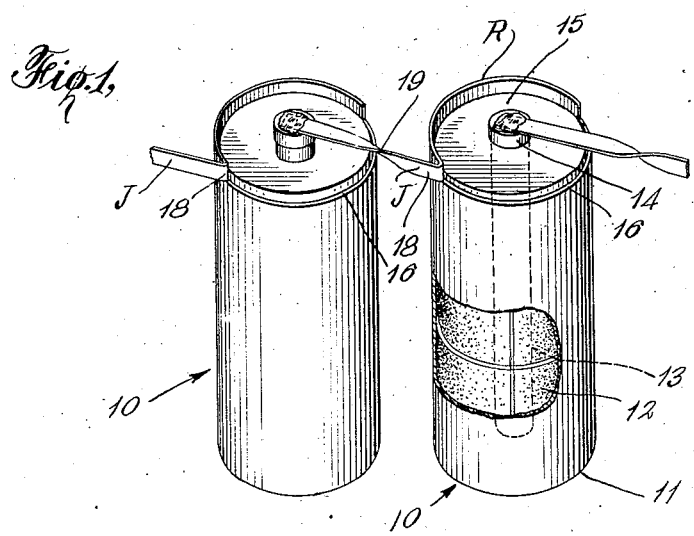
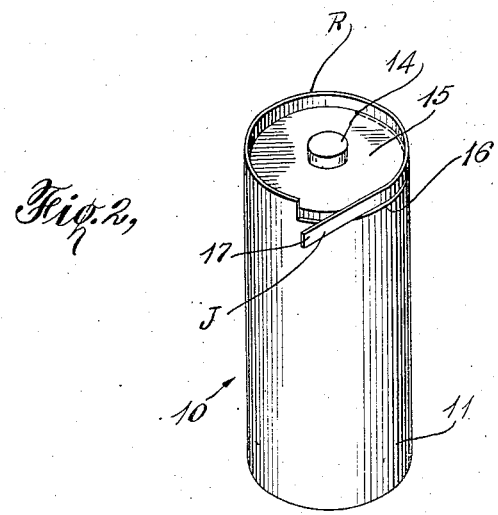
Reuben Eckstein
INVENTOR
BY
ATTORNEY Patented Aug. 6, 1929.

1,723,727

UNITED STATES PATENT OFFICE.

REUBEN ECKSTEIN, OF NEW YORK, N. Y.

ELECTRIC BATTERY AND METHOD FOR MAKING SAME.

Application filed March 17, 1927. Serial No. 176,007.

This invention relates to batteries and the method for making same.

One object of the invention is to provide an improved battery construction, as for example the so-called "B" dry battery of commerce, in which the jumper for interconnecting the cells is formed in a novel and economical manner.

Another object of the invention is to provide an improved battery casing having an integral jumper formed of the material extending about the periphery of the rim thereof.

Still another object of the invention is to provide a novel and improved process of manufacturing battery cells of the character described.

A still further object of the invention is to provide a device of the character described comprising few and simple parts, which shall be easy and cheap to manufacture, and practical and efficient to a high degree in operation.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a fragmentary perspective view of a battery unit showing a pair of battery cells constructed and connected to embody the invention; and Fig. 2 is a perspective view of a battery casing in the course of being manufactured according to the improved process.

Referring in detail to the drawing, 10 denotes a battery cell embodying the invention. In Fig. 1 is shown two cells 10 connected in series and forming a fragmentary portion of a battery unit such as formed in the so-called "B" dry battery of commerce. Each of said battery cells 10 includes a casing 11 in which is housed a bobbin 12, the latter having an axially extending carbon electrode 13. The projecting end of said electrode forms a terminal for the cell and is surmounted by the usual metallic contact cap 14.

The casing 11 may be made in any well known manner and for small size cells, said casing is formed of a single blank sheet of zinc by a cold drawn or other like operation. The bobbin 12 which has been formed independently is inserted in the formed casing and a suitable material 15 applied over the opening of the casing for sealing the bobbin in place in the well understood manner. The casing is then cut or scored transversely its length below and parallel to the top rim R thereof, the cut line being denoted in the drawing in Fig. 2 at 16. A peripheral ribbon is thus formed which when severed at one end 17 forms the jumper J.

The jumper is next unravelled by bending outwardly as at 18 and twisting as at 19 to lie with its free end portion horizontal to facilitate connecting it to the carbon electrode contact cap 14 of an adjacent battery cell, thus connecting said cells in series as shown in Fig. 1.

The battery cells are preferably interconnected by soldering the jumpers J to said caps 14 when forming the battery unit. Any number of battery cells may be thus connected after which the unit is encased to form a rigid structure in a suitable container (not shown) of any well known construction.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. In a battery cell of the character described, a casing therefor having a partially severed rim portion bent outwardly from said casing substantially in the plane of said rim.

2. In a battery of the character described, in combination, a plurality of cells, each comprising a central terminal and a casing having a partially severed rim portion bent outwardly therefrom, the outwardly bent portion of one of said cells being connected to the central terminal of another of said cells, said portion of said first mentioned cell crossing the space provided by the outwardly bent portion of the rim of said other cell.

3. In a battery of the character described, in combination, a plurality of cells, each comprising a central terminal and a casing having a partially severed rim portion bent outwardly therefrom, the outwardly bent portion of one of said cells being connected to the central terminal of another of said cells, said portion of said first mentioned cell crossing the space provided by the outwardly bent portion of the rim of said other cell, said outwardly bent portion extending substantially in the plane of the rim from which it is severed.

In testimony whereof I affix my signature.

REUBEN ECKSTEIN.